(12) United States Patent
Chun

(10) Patent No.: US 7,858,225 B2
(45) Date of Patent: Dec. 28, 2010

(54) CYLINDRICAL LITHIUM SECONDARY BATTERY AND METHOD OF FABRICATING THE SAME

(75) Inventor: Kwan Sic Chun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 254 days.

(21) Appl. No.: 11/406,770

(22) Filed: Apr. 18, 2006

(65) Prior Publication Data

US 2006/0240319 A1 Oct. 26, 2006

(30) Foreign Application Priority Data

Apr. 25, 2005 (KR) .................. 10-2005-0034221

(51) Int. Cl.
*H01M 2/26* (2006.01)
(52) U.S. Cl. .................. 429/161; 429/160; 429/133
(58) Field of Classification Search .................. 429/161, 429/133, 160
See application file for complete search history.

(56) References Cited

U.S. PATENT DOCUMENTS

| 4,040,938 | A | * | 8/1977 | Robertson .................. 204/283 |
| 6,287,719 | B1 | | 9/2001 | Bailey |
| 6,451,473 | B1 | * | 9/2002 | Saito et al. .................. 429/94 |

FOREIGN PATENT DOCUMENTS

| EP | 1 469 537 A2 | 10/2004 |
| JP | 2-132758 | 5/1990 |
| JP | 5-121064 | 5/1993 |
| JP | 9-35739 | 2/1997 |
| JP | 2000-003722 | 1/2000 |
| JP | 2004-199938 | 7/2004 |

OTHER PUBLICATIONS

Patent Abstracts of Japan, Publication No. 02-132758, dated May 22, 1990, in the name of Shinji Hamada.
Patent Abstracts of Japan, Publication No. 05-121064, dated May 18, 1993, in the name of Takeshi Minafuji et al.
Patent Abstracts of Japan, Publication No. 09-035739, dated Feb. 7, 1997, in the name of Emi Ishikawa.
European Search Report dated Aug. 4, 2006, for 06113020.9, in the name of Samsung SDI Co., Ltd.
Patent Abstracts of Japan for Publication No. 2000-003722; dated Jan. 7, 2000 in the name of Hiroyuki Nishida.

* cited by examiner

*Primary Examiner*—Jane Rhee
(74) *Attorney, Agent, or Firm*—Christie, Parker & Hale, LLP

(57) ABSTRACT

A cylindrical lithium secondary battery includes an electrode assembly formed by stacking a first electrode plate having a first electrode tap, a second electrode plate having a second electrode tap, and a separator interposed between the first and second electrode plates. The first electrode plate, the second electrode plate and the separator are wound to form the electrode assembly. The secondary battery also includes a case for storing the electrode assembly and a cap assembly combined with an upper portion of the case to sealing the case. The radius of curvature of the second electrode tap is greater than the radius of curvature of the first electrode tap.

6 Claims, 8 Drawing Sheets

CYLINDRICAL LITHIUM SECONDARY BATTERY AND METHOD OF FABRICATING THE SAME

BACKGROUND OF THE INVENTION

This application claims the priority to and the benefit of Korean Patent Application No. 10-2005-0034221, filed on Apr. 25, 2005, in the Korean Intellectual Property Office, the entire content of which is incorporated herein by reference.

1. Field of the Invention

The present invention relates to a secondary battery, and more particularly, to a cylindrical lithium secondary battery and a method of fabricating the same.

2. Description of the Related Art

Recently, compact and lightweight electronic devices such as cellular phones, laptop computers, and camcorders are being widely developed and produced. Such portable electronic devices are typically provided with a battery pack so that the devices can be operated anywhere. The battery pack has at least one battery to drive the portable electronic devices for a predetermined time period.

A rechargeable secondary battery is usually produced with consideration given to cost efficiency. For example, rechargeable secondary batteries such as a Ni—Cd battery, a Ni-MH battery, a Li battery, and a Li-ion battery are available in the art.

Lithium secondary batteries have a high energy density per a unit weight and an operation voltage of 3.6V, which is triple that of a Ni—Cd battery or a Ni-MH battery. Therefore, lithium secondary batteries are increasingly used in the art.

In a lithium secondary battery, lithium based oxide is used as a positive electrode activation material, while a carbon based material is used as a negative electrode activation material. Generally, lithium secondary batteries are classified as liquid electrolyte batteries or polymer electrolyte batteries depending on the electrolyte used therein. A battery using liquid electrolyte is called a lithium ion battery, and a battery using polymer electrolyte is called a lithium polymer battery. In addition, lithium secondary batteries are fabricated in a variety of shapes such as cylindrical, rectangular, pouch types, and the like.

Typically, cylindrical lithium secondary batteries include an electrode assembly formed by winding a positive electrode plate to which a positive electrode tap is attached, a negative electrode plate to which a negative electrode tap is attached, and a separator interposed between the positive and negative electrode plates to prevent a short circuit and allow only lithium ions to move. Additionally, a cylindrical case may be provided to store the electrode assembly and electrolyte may be injected into the cylindrical case to allow lithium ions to move.

A cylindrical lithium secondary battery may be formed as follows. First, the positive electrode plate to which the positive electrode tap is attached, the negative electrode to which the negative electrode tap is attached, and a separator are stacked and wound to provide a cylindrical electrode assembly. In this case, the positive electrode tap is disposed at a winding start position, and the positive and negative electrode taps are in the shape of a plate.

Subsequently, the electrode assembly is inserted into a cylindrical case for a lithium secondary battery so that the electrode assembly does not separate. Then, electrolyte is injected into the cylindrical case and the case is sealed completing the cylindrical lithium secondary battery.

However, in a conventional cylindrical lithium secondary battery, since the positive electrode tap is disposed at a winding start position, the shape of the electrode assembly deviates from a cylindrical shape as it is wound. More specifically, the electrode assembly may tend to resemble an ellipsoid instead of a cylinder, preventing or inhibiting insertion of the electrode assembly into the cylindrical case.

Also, a protrusion formed on the electrode assembly due to the geometrical deviation from a cylindrical shape may result in scratches on the cylindrical case or on the electrode assembly when inserting the electrode assembly into the cylindrical case, leading to potential battery defects.

SUMMARY OF THE INVENTION

A cylindrical lithium secondary battery is provided having a cylindrical electrode assembly and a method of fabricating the same.

According to an embodiment of the present invention, a cylindrical lithium secondary battery includes an electrode assembly formed by stacking a first electrode plate to which a first electrode tap is attached, a second electrode plate to which a second electrode tap is attached, and a separator interposed between the first and second electrode plates and winding them, at least one of the first and second electrode taps having a cross-section of a predetermined radius of curvature; a case having a space for storing the electrode assembly; and a cap assembly combined with an upper portion of the case for sealing the case.

One of the first and second electrode taps attached to a winding start position may have a predetermined radius of curvature.

The first and second electrode taps may have different radiuses of curvature, and a radius of curvature of one of the first and second electrode taps attached to a winding end position may be larger than that of the other attached to a winding start position.

A radius of curvature of one of the first and second electrode taps attached to a winding start position may be within a range of 0.5-2.5 mm, whereas a radius of curvature of the other of the first and second electrode taps attached to a winding end position may be within a range of 8.0-20.0 mm.

According to another embodiment of the present invention, there is provided a method of fabricating a cylindrical lithium secondary battery, comprising steps of: preparing a first electrode plate to which a first electrode tap is attached, a second electrode plate to which a second electrode tap is attached, and a separator interposed between the first and second electrode plates; forming an electrode assembly using one of the first and second electrode taps as a winding start position; and inserting the electrode assembly into the cylindrical case, wherein the preparation of the first electrode plate, the second electrode plate, and the separator includes a step of allowing at least one of the first and second electrode taps disposed at a winding start position to have a predetermined radius of curvature.

The step of allowing at least one of the first and second electrode taps disposed at a winding start position to have a predetermined radius of curvature may include steps of: attaching an electrode tap having a plate shape to the electrode plate; and providing a predetermined radius of curvature by forging or rolling the electrode taps using a bar.

A method for providing a substantially cylindrical jellyroll wound electrode assembly for a cylindrical lithium secondary battery having a center axis includes stacking a first electrode plate, a separator and a second electrode plate as an unwound electrode assembly. A first electrode tap having a radius of curvature corresponding to a predetermined first axial radius about the center axis and a second electrode tap having a radius of curvature corresponding to a predetermined second axial radius about the center axis are provided, the second axial radius being larger than the first axial radius. The first electrode tap is located at a winding start position on the first electrode plate of the unwound electrode assembly and the second electrode tap is located at a winding end position on the second electrode plate of the unwound electrode assembly. The unwound electrode assembly is wound about the center axis into a jelly-roll wound electrode assembly.

DETAILED DESCRIPTION

Figure 1A:
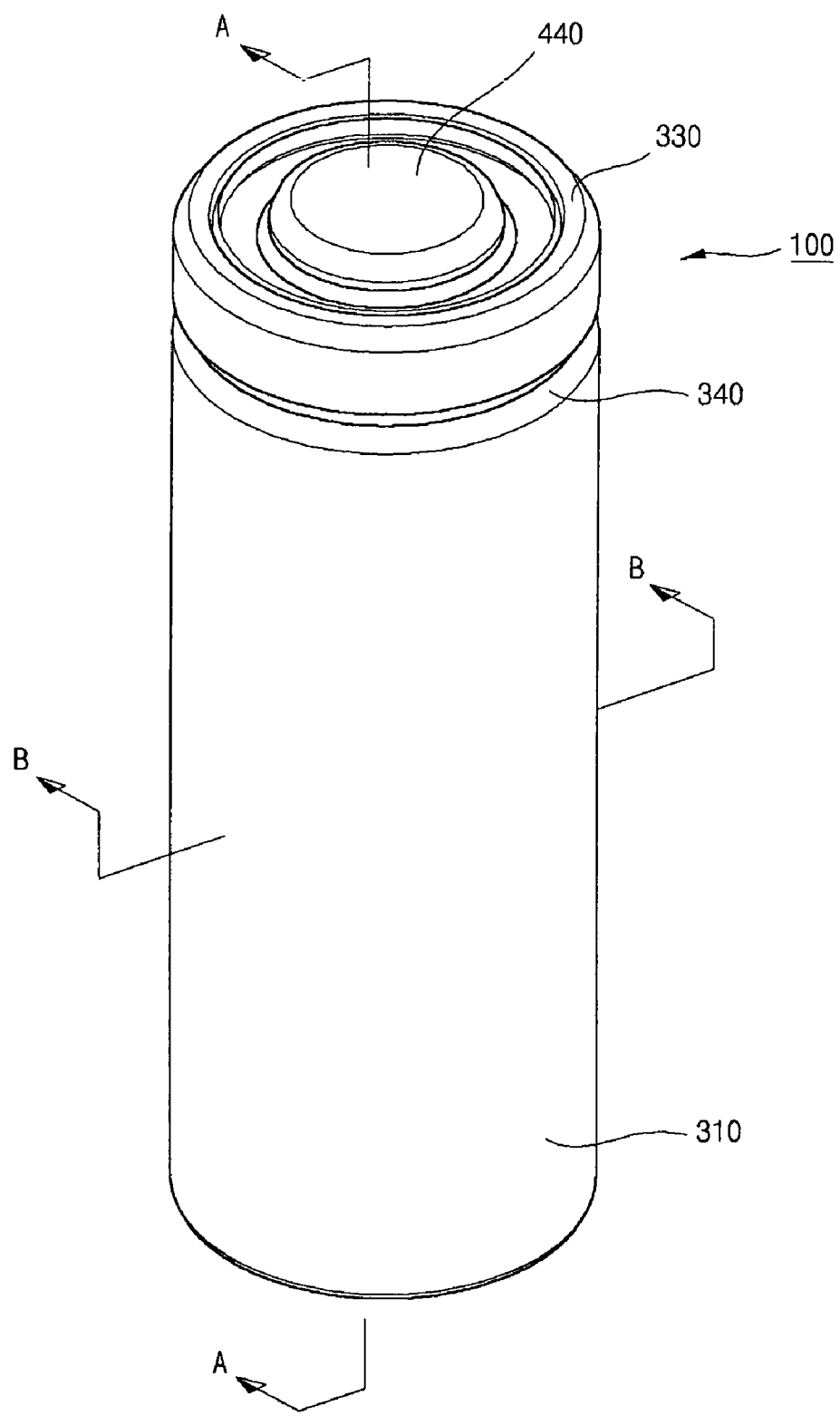
FIG. 1A is a perspective view of a cylindrical lithium secondary battery according to an embodiment of the present invention.
Figure 1B:
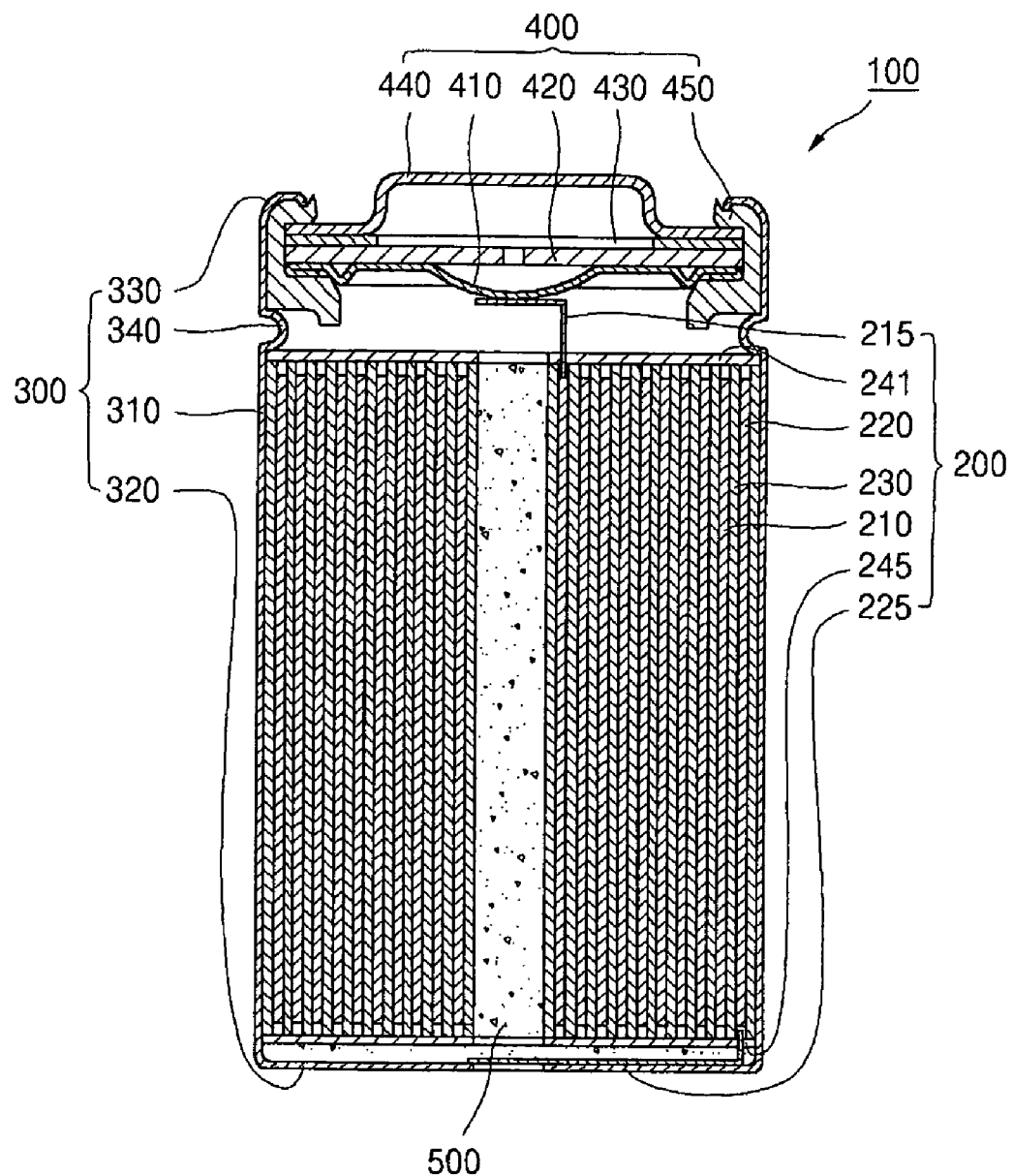
FIG. 1B is a cross-sectional view along a line A-A of FIG. 1A.
Figure 1C:
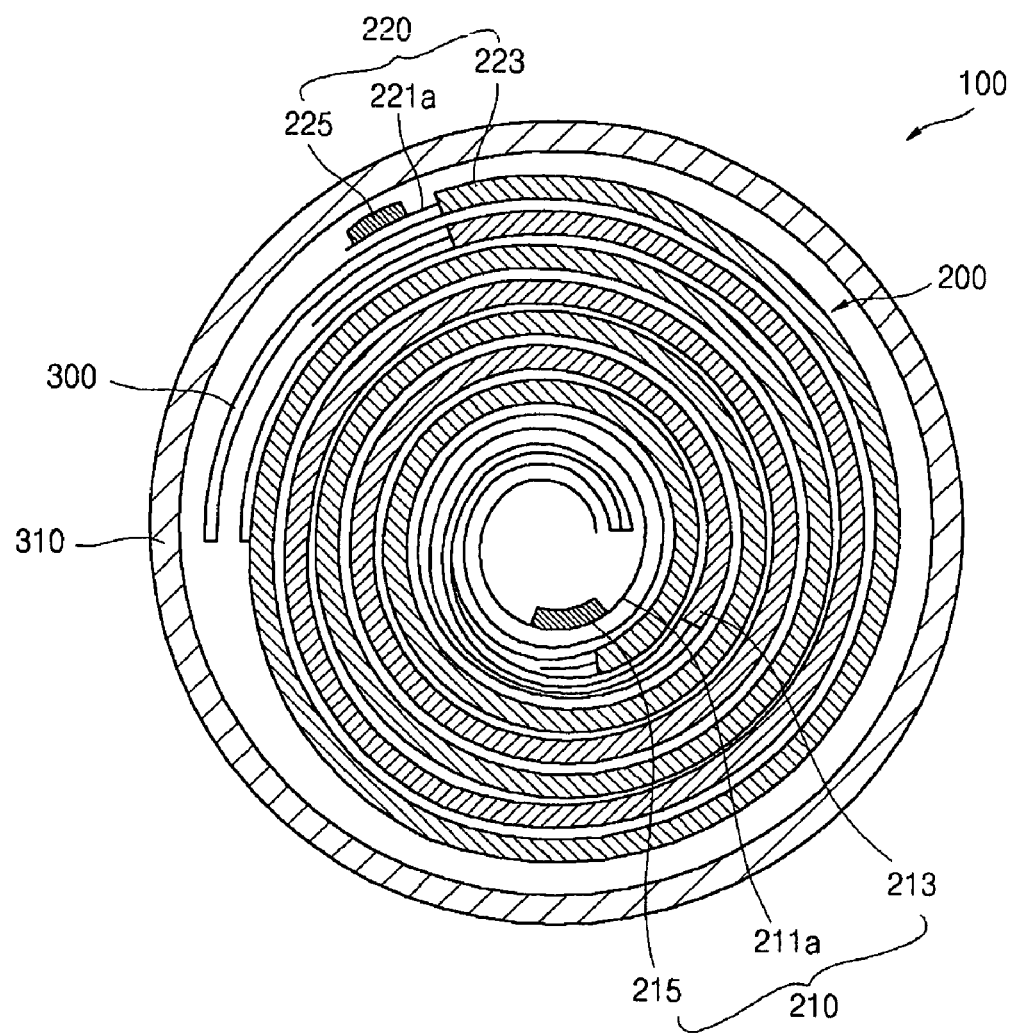
FIG. 1C is a cross-sectional view along a line of B-B of FIG. 1A.

Referring to FIGS. 1A through 1C, a cylindrical lithium secondary battery 100 according to an embodiment of the present invention includes: an electrode assembly 200 which generates voltage difference during charging/discharging; a cylindrical case 300 for storing the electrode assembly 200; a cap assembly 400 combined with the top of the cylindrical case 300 to prevent separation of the electrode assembly 200; and electrolyte 500 injected into the cylindrical case 300 to allow the lithium ions to move in the electrode assembly 200.

The electrode assembly 200 includes a first electrode plate 210, a second electrode plate 220, and a separator 230 interposed between the first and second electrode plates 220. In addition, the first and second electrode plates 210, 220, and the separator 230 are wound into a circular cross-sectional shape and then stored in the cylindrical case 300. In this case, the first and second electrode plates 210, 220 are structured to have an electrode charge collector (not shown), activation material layers 213, 223 formed on the electrode charge collector, and first and second electrode taps 215, 225 protruding by a predetermined length and attached to non-coating portions 211a, 221a which are absent activation material layers. In one exemplary embodiment, the first and second electrode taps 215, 225 are attached to the first and second electrode plates 210, 220, respectively, so that the electrode tap 215, 225 disposed at a winding start position of the stack has a cross-section of a predetermined radius of curvature. More specifically, the second electrode tap 225 disposed at a winding end position of the stack may have a larger radius of curvature than that of the first electrode tap 215 disposed at the top of the stack. For example, the first electrode tap 215 may have a radius of curvature of between about 0.5-2.5 mm, while the second electrode tap may have a radius of curvature of between about 8.0-20.0 mm.

Furthermore, upper and lower insulation plates 241, 245 (FIG. 1B) are attached to upper and lower portions of the electrode assembly 200, respectively, to prevent direct contact between the cap assembly 400 and the cylindrical case 300.

The cylindrical case 300 has a cylindrical side surface 310 having a predetermined radius of curvature and a predetermined space for joining the electrode assembly 200. A lower surface 320 for sealing the lower space of the cylindrical side surface 310 is formed on the lower portion of the cylindrical side surface 310. The top of the cylindrical side surface 310 is open to allow insertion of the electrode assembly 200. One of the first and second electrode taps 215, 225 is attached to the center of the bottom surface of the cylindrical case 300 so that the cylindrical case 300 itself functions as an electrode (e.g., a negative electrode) having an identical polarity to a second electrode plate 220. In addition, the cylindrical case 300 is generally formed of a material selected from a group consisting of Al, Fe, or an alloy of the same. Furthermore, the cylindrical case 300 has a crimping portion 330 towards the center of the case 300 to apply downward pressure to the cap assembly 400 at the top of the cylindrical case 300. A beading portion 340 protrudes inside the case 300 for applying upward pressure to the cap assembly 400.

The cap assembly 400 includes: a conductive safety vent 410 welded to the first electrode tap 215 and deformed when the battery is overcharged or overheated. A printed circuit board (PCB) 420 is electrically and mechanically connected to the upper portion of the conductive safety vent 410 and switched off when the safety vent 410 is deformed. A thermistor 430 is electrically and mechanically connected to the upper portion of the printed circuit board 420 for switching off the circuitry when the battery is heated over a predetermined temperature. A conductive electrode cap 440 is electrically and mechanically connected to the upper portion of the thermistor 430 to which external currents may be applied. An insulation gasket 450 enclosing the safety vent 410, the printed circuit board 420, the thermistor 430, and the electrode cap 440 for insulating them from the cylindrical case 300.

The electrolyte 500 functions as a medium for delivering lithium ions generated by electro-chemical reaction in the positive and negative electrodes of the battery. The electrolyte 500 may be a non-aqueous organic electrolyte including a compound of lithium salt and highly pure organic solvents. In addition, the electrolyte 500 may include polymer using polymer electrolyte. It is noted that the present invention is not limited to the aforementioned types of the electrolyte.

Figure 2:
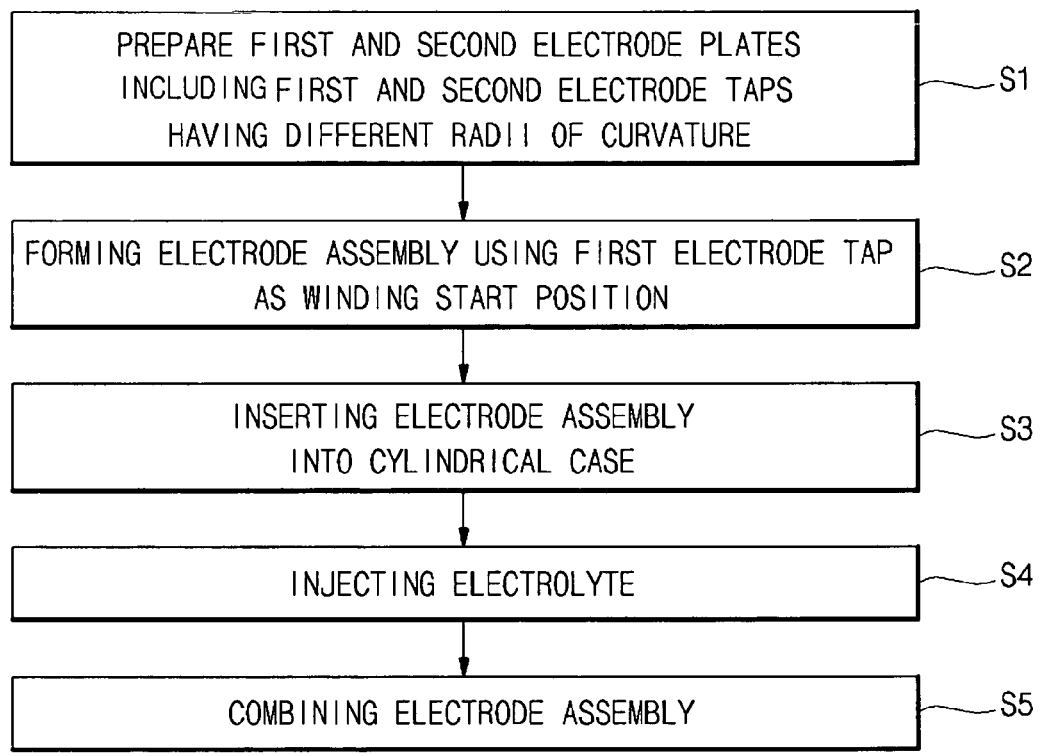
FIG. 2 is a flowchart for describing a method of fabricating a cylindrical lithium secondary battery according to an embodiment of the present invention.

FIG. 2 is a flowchart for describing a method of fabricating a cylindrical lithium secondary battery according to an embodiment of the present invention. Referring to FIG. 2, a method of fabricating a cylindrical lithium secondary battery according to an embodiment of the present invention includes preparing first and second electrode plates to which first and second electrode taps having different radii of curvature are attached, respectively, and a separator (S1). Then, an electrode assembly is formed using the first electrode tap as a winding start position in a stack (S2). The electrode assembly is inserted into the cylindrical case (S3); and electrolyte is injected into the case. Finally, the cap assembly (S5) is combined with the case.

FIGS. 3A-3E illustrate a method of fabricating a cylindrical lithium secondary battery according to an embodiment of the present invention, which will now be described in detail also in association with FIG. 2.

Figure 3A:
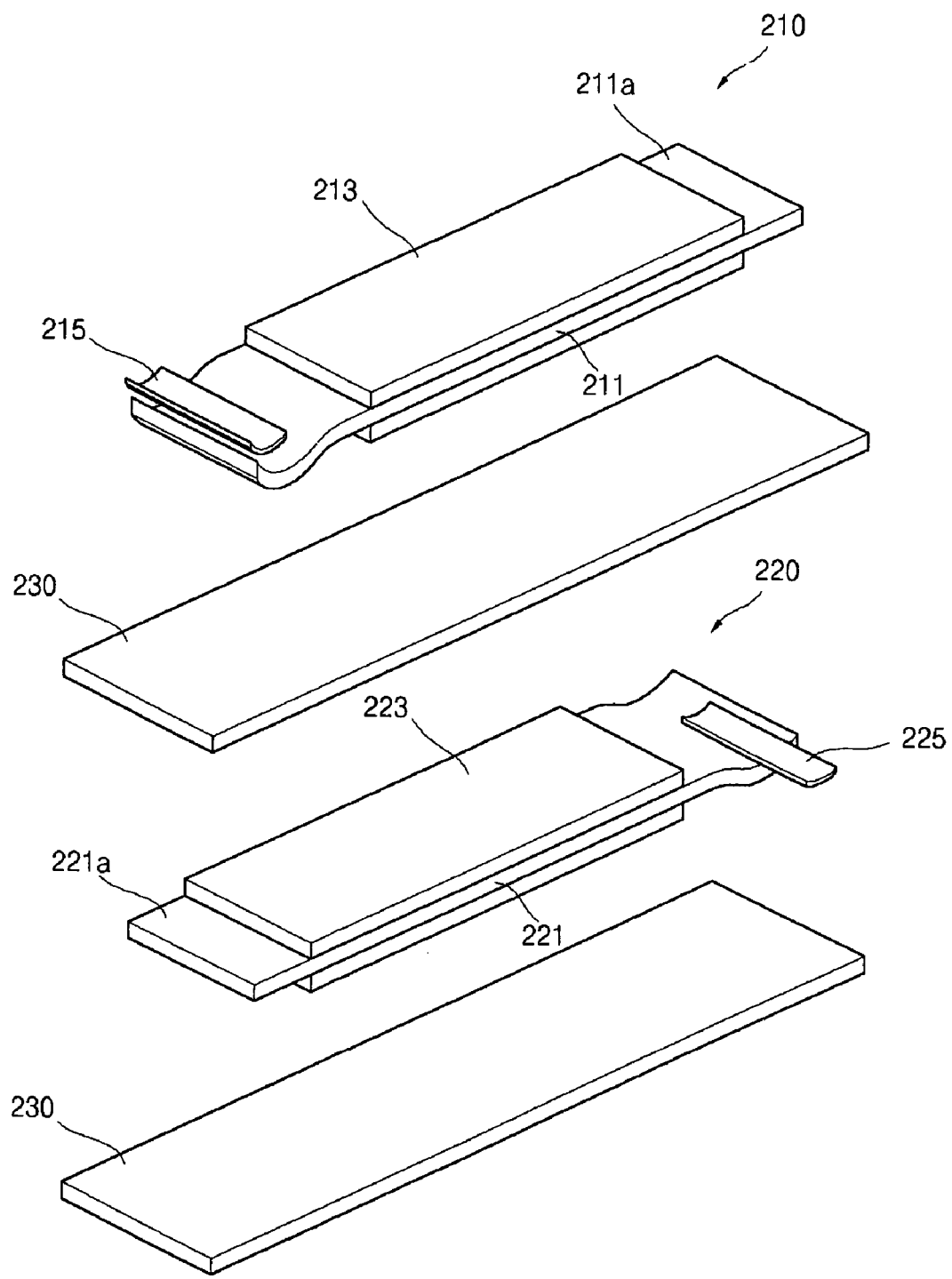
FIGS. 3A, 3B, 3C, 3D and 3E illustrate a sequence of fabricating a cylindrical lithium secondary battery according to an embodiment of the present invention.

First, in step S1, the first and second electrodes 210, 220, and a separator 230 are prepared as shown in FIG. 3A.

In this case, the first and second electrode plates 210, 220 are structured to include electrode charge collectors 211, 221, respective activation material layers 213, 223, and first and second electrode taps 215, 225 attached to respective non-coated portions 211a, 221a.

In addition, the first and second electrode taps 215, 225 attached to the first and second electrode plates 210, 220, respectively, may have different radii of curvature. For example, the second electrode tap 225 disposed at the winding end position of the stack may have a larger radius of curvature than the electrode tap disposed at the winding start position of the stack. More specifically, the first electrode tap 215 may have a radius of curvature between about 0.5-2.5 mm, while the second electrode tap 225 may have a radius of curvature between about 8.0-20.0 mm. The first and second electrode taps 215, 225 are formed to have different radii of curvature to prevent an ellipsoid shape from being generated by winding the first and second electrode taps 215, 225 when the electrode assembly 200 is assembled. Of course, the non-coated portions 211a, 221a attached to the first and second electrode taps 215, 225, respectively, also may have different radii of curvature corresponding to the first and second electrode taps 215, 225.

The radii of curvature of the first and second electrode taps 215, 225 may be formed through forging or rolling by using a bar after flat electrode taps are attached to the first and second electrode plates 210, 220. However, the present invention is not intended to be limited to the disclosed methods of forming the radii of curvature of the first and second electrode taps 215, 225.

Figure 3B:
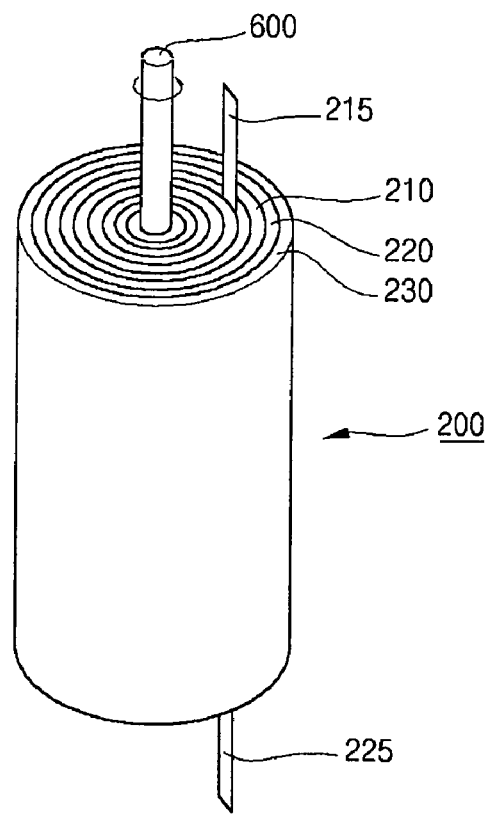

In step S2 of forming an electrode assembly using the first electrode tap as its winding start position, as shown in FIG. 3B, the first electrode plate 210, the separator 230, and the second electrode plate 220 are stacked and wound along a winding axis 600. A portion of the first electrode plate 210 having a predetermined radius of curvature to which the first electrode tap 215 is attached is used as a winding start position, thereby completing the electrode assembly 200.

Figure 3C:
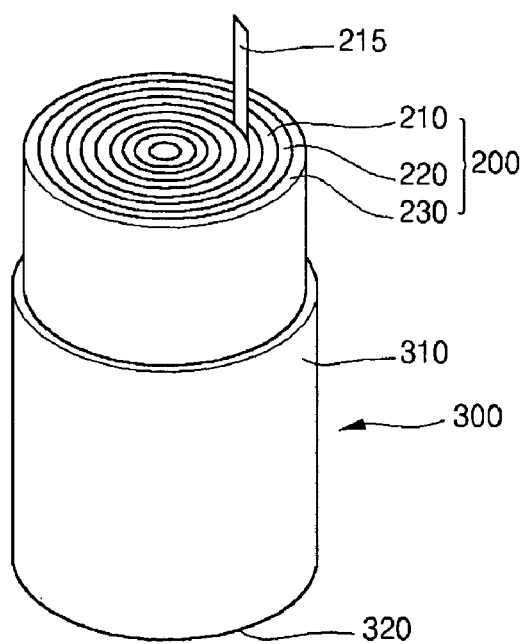

In step S3 the electrode assembly 200 is inserted into the cylindrical case as shown in FIG. 3C, and the winding axis 600 is removed from the electrode assembly 200. The winding axis 200 may be separated before the electrode assembly 200 is inserted, and the present invention is not limited by the timing of removing the winding axis 200. In addition, a lower insulation plate (not shown) may be provided in the cylindrical case 300.

The winding axis 600 may function as a center pin in the electrode assembly 200 to prevent loosening of the electrode assembly 200 and deformation of the electrode assembly 200 caused by external pressure.

Figure 3D:
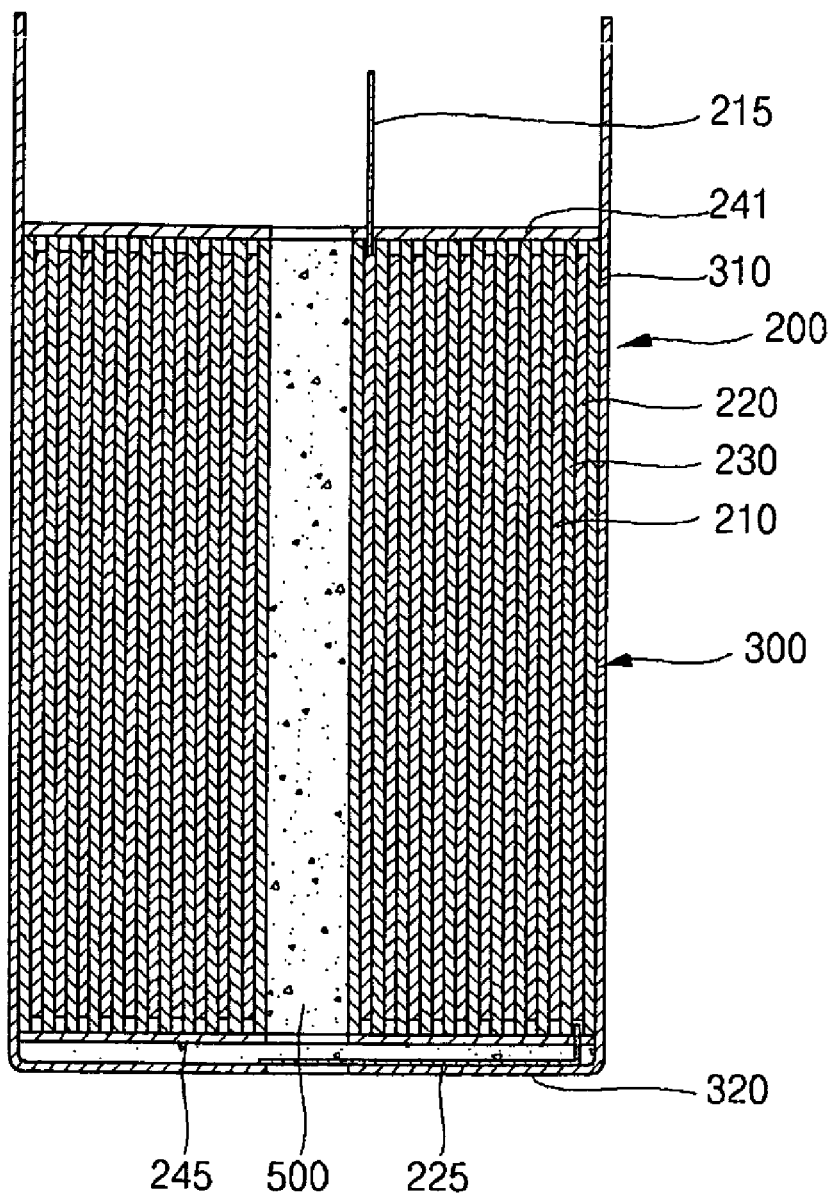

In step S4, the electrolyte 500 is injected until the level of the injected electrolyte reaches an upper end of the electrode assembly 200 as shown in FIG. 3D. The electrolyte 500 serves to allow lithium ions in the electrode assembly 200 to move between the first and second electrode plates 210, 220 during charging/discharging the battery.

Figure 3E:
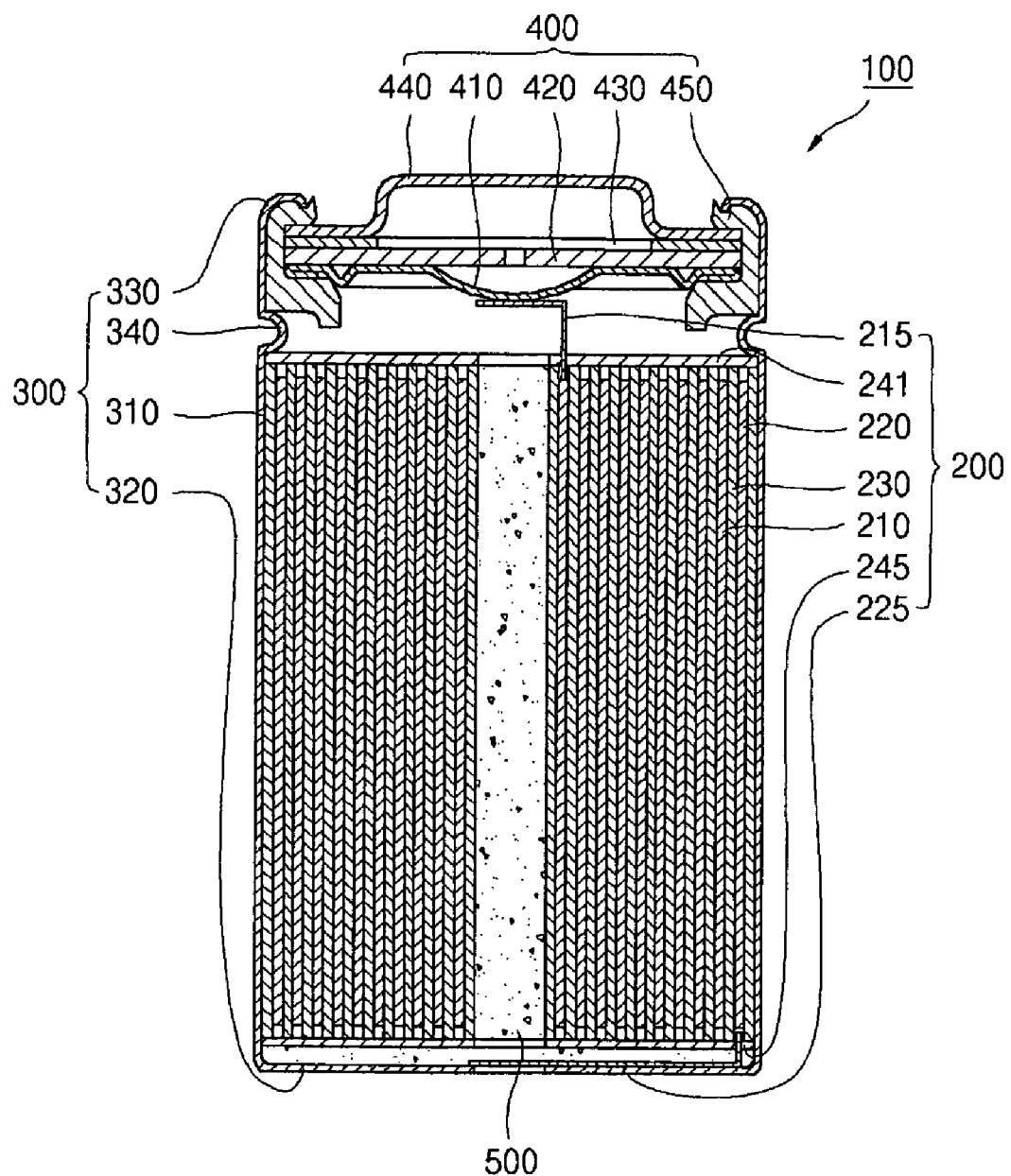

In step S5, a cap assembly 400 as described above is combined with the cylindrical case as shown in FIG. 3E, so that electrolyte 500 is sealed in the case, thereby completing the cylindrical lithium secondary battery 100.

More specifically, an insulation gasket 450 having a ring shape is combined with the upper portion of the cylindrical case 300. A conductive safety vent 410 is then electrically connected to either the first or second electrode taps 215, 225. A printed circuit board 420, a thermistor 430, and the electrode cap 440 are sequentially combined inside of the cylindrical case 300.

Subsequently, a beading portion 340 protruding inside the case formed by beading a portion of the cylindrical case 300 corresponding to the lower end of the insulation gasket 450. A crimping portion 330 is formed by crimping the top end of the cylindrical case 300 so that the cap assembly 400 is securely sealed.

As described above, according to an embodiment of the present invention, it is possible to provide a cylindrical lithium secondary battery 100 wherein the first and second electrode taps 215, 225 are formed to have different radii of curvature so that the generally circular cross-section of the electrode assembly 200 may be maintained, and the process of inserting the electrode assembly 200 into the cylindrical case 300 may be easier. Therefore, it is possible to reduce the number of defected electrode assemblies 200.

While the present invention has been particularly shown and described with reference to exemplary embodiments, it will be understood by those of ordinary skill in the art that various changes in form and details may be made without departing from the spirit and scope of the present invention as defined by the following claims.

What is claimed is:

1. A cylindrical lithium secondary battery comprising:
   an electrode assembly including a first electrode plate comprising a first charge collector having a longitudinal axis extending in a first direction and a first electrode tap having a longitudinal axis extending in a second direction substantially perpendicular to the first direction, wherein the first electrode tap protrudes from the first electrode plate, a second electrode plate comprising a second charge collector having a longitudinal axis extending in the first direction and a second electrode tap having a longitudinal axis extending in the second direction, wherein the second electrode tap protrudes from the second electrode plate, and a separator between the first electrode plate and the second electrode plate, the first electrode plate, the second electrode plate and the separator being wound;
   a case housing the electrode assembly; and
   a cap assembly sealing the case and comprising a deformable safety vent, wherein the first electrode tap electrically contacts the deformable safety vent;
   wherein the first electrode tap and the second electrode tap each have a bar imparted radius of curvature.

2. The cylindrical lithium secondary battery of claim 1, wherein the first electrode tap or the second electrode tap is at a winding start position.

3. The cylindrical lithium secondary battery of claim 1, wherein the bar imparted radius of curvature of the second electrode tap at a winding end position is greater than the bar imparted radius of curvature of the first electrode tap at a winding start position.

4. The cylindrical lithium secondary battery of claim 1, wherein the bar imparted radius of curvature of the first electrode tap at a winding start position is between about 0.5 mm to about 2.5 mm and the bar imparted radius of curvature of the second electrode tap at a winding end position is between about 8.0 mm to about 20.0 mm.

5. A method of fabricating a cylindrical lithium secondary battery comprising:
   attaching a first electrode tap having a longitudinal axis extending in a first direction to a first electrode plate comprising a first charge collector having a longitudinal axis extending in a second direction substantially perpendicular to the first direction such that the first electrode tap protrudes from the first electrode plate in the first direction;
   attaching a second electrode tap having a longitudinal axis extending in the first direction to a second electrode plate comprising a second charge collector having a longitudinal axis extending in the second direction such that the second electrode tap protrudes from the second electrode plate in the first direction;

interposing a separator between the first electrode plate and the second electrode plate;

forging or rolling the first electrode tap and the second electrode tap with a bar to impart a curvature thereto;

winding the first electrode plate, the second electrode plate and the separator into an electrode assembly using the first electrode tap as a winding start position; and inserting the electrode assembly into a cylindrical case;

wherein a radius of curvature of the second electrode tap is greater than a radius of curvature of the first electrode tap.

6. A method for providing a substantially cylindrical jelly-roll wound electrode assembly for a cylindrical lithium secondary battery having a center axis, comprising:

stacking a first electrode plate, a separator and a second electrode plate as an unwound electrode assembly, wherein the unwound electronic assembly has a longitudinal axis extending in a first direction;

forging or rolling a first electrode tap having a first longitudinal axis with a bar to impart a radius of curvature corresponding to a first axial radius about the center axis;

forging or rolling a second electrode tap having a second longitudinal axis with a bar to impart a radius of curvature corresponding to a second axial radius about the center axis, the second axial radius being larger than the first axial radius;

placing the first electrode tap at a winding start position on the first electrode plate of the unwound electrode assembly such that the first electrode tap protrudes from the first electrode plate along the first longitudinal axis in a second direction substantially perpendicular to the first direction;

placing the second electrode tap at a winding end position on the second electrode plate of the unwound electrode assembly such that the second electrode tap protrudes from the second electrode plate along the second longitudinal axis in the second direction; and winding the unwound electrode assembly about the center axis into a jelly-roll wound electrode assembly.

* * * * *